United States Patent

Kimura et al.

Patent Number: 5,902,508
Date of Patent: *May 11, 1999

[54] INDUCTION HEATING COIL SUITABLE FOR FLOATING ZONE PROCESSING

[75] Inventors: Masanori Kimura, Annaka; Naosato Yoshida, Ohmiya, both of Japan

[73] Assignee: Shin-Etsu Handotai Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/815,902

[22] Filed: Mar. 12, 1997

Related U.S. Application Data

[63] Continuation of application No. 08/302,403, Sep. 8, 1994, abandoned.

[30] Foreign Application Priority Data

Oct. 21, 1993 [JP] Japan .................................... 5-287825

[51] Int. Cl.⁶ ......................................................... H05B 6/40
[52] U.S. Cl. ............................ 219/638; 219/675; 373/139
[58] Field of Search .................................... 219/638, 672, 219/675, 676; 373/139

[56] References Cited

U.S. PATENT DOCUMENTS

| | | | |
|---|---|---|---|
| 3,249,406 | 5/1966 | Crosby et al. | 219/638 |
| 3,258,573 | 6/1966 | Morin et al. | 219/672 |
| 4,109,128 | 8/1978 | Kohl . | |
| 4,207,451 | 6/1980 | Tudbury | 219/672 |
| 4,220,839 | 9/1980 | De Leon | 219/638 |
| 4,506,132 | 3/1985 | Keller | 219/638 |
| 4,538,279 | 8/1985 | Keller | 373/139 |
| 4,698,473 | 10/1987 | Alcini et al. | 219/674 |

FOREIGN PATENT DOCUMENTS

| | | | |
|---|---|---|---|
| 130426 | 3/1978 | Germany | 219/638 |
| 3143146 | 5/1983 | Germany . | |
| 3226713 | 1/1984 | Germany . | |

*Primary Examiner*—Philip H. Leung
*Attorney, Agent, or Firm*—Whitham, Curtis & Whitham

[57] ABSTRACT

An induction heating coil used in a floating zone melting method, characterized in that the path of a high-frequency current is controllable in the body surface of the coil and by the use of the coil a more uniform resistivity profile across a diameter is achieved as compared with those from the prior art. In the coil a second metal or alloy different in electric conductivity from a first metal or alloy of the coil is disposed in a predetermined place(s) to control the path of a high-frequency current, wherein the second metal or alloy has, for example, higher electric conductivity than the first metal or alloy and a long narrow and thin strip made of the second metal or alloy is disposed in such a manner that it meanders on the body surface of the coil between the outer and inner peripheries periodically.

22 Claims, 5 Drawing Sheets

INDUCTION HEATING COIL SUITABLE FOR FLOATING ZONE PROCESSING

This application is a continuation of application Ser. No. 08/302,403, filed Sep. 8, 1994 now abandoned.

BACKGROUND OF THE INVENTION

1. Field of the Invention

The present invention relates to an induction heating coil used as the heating device of a semiconductor single crystal grower and more particularly to an induction heating coil used for a crystal grower in which a dopant substance is uniformly dispersed in a grown crystal during the growth by FZ method (an abbreviation of the so-called floating zone melting method).

2. Description of the Prior Art

An apparatus used for growing a semiconductor single crystal by FZ method comprises an upper shaft for holding a raw material rod, a lower shaft for holding a seed crystal made of a single crystal semiconductor having a smaller diameter and a heating device arranged such that it causes the raw material rod to fuse by heating.

In growing a single crystal with the apparatus above-mentioned, an end of the raw material rod is fused to be connected to the free tip of the seed crystal to produce a molten zone and in succession a narrow single crystal rod portion is grown dislocation free on the seed crystal and then the raw material rod starts moving downward together with the seed crystal relative to the heating device to drive the molten zone toward the other end of its own along the rod, while being rotated about its axis and thereby almost the whole length is crystallized in the shape of a rod.

An apparatus for growing a crystal rod requires that a raw material is fully fused without any core portion left not fused within a narrow molten zone therein during zone melting. Therefore, as a heating device, which meets the requirement, for example, an induction heating coil having a construction of a single turn and being flat is well known in the prior art.

Such well known induction heating coils include, for example, an induction heating coil 1 as shown in FIG. 2, wherein a hollow conductor 4 is bent in the shape of a ring and both of the ends are located face to face with a gap 3 interposed therebetween in the closest relation that does not cause undesirable sparks with each other. The induction heating coil is electrically connected to a pair of power source terminals 5 at the two respective points on the outer vertical surface in the vicinity of both the coil ends and the section in parallel with the radial direction is in the shape of a wedge (the Japanese second publication No.51-24964, hereinafter referred to as the first prior art).

Such a construction of the coil of the first prior art may give rise to a current path almost a perfect geographic symmetry to the coil center in the surface of the coil. When a high-frequency current is supplied through the power source terminals 5 to the coil 1, an electromagnetic field is formed on and around the coil 1 and the field is almost uniform in strength in the area surrounded by the inner periphery 2, within which a raw material rod is vertically disposed therethrough and thereby the rod is partly heated to form a molten zone therein.

However, an induction coil of the first prior art has the end gap 3 being formed in parallel with a plane perpendicular to a tangent at the ends of the peripheries of the coil and thereby uniformity is caused in the vicinity of the gap 3. On the other hand, the high-frequency current supplied from the power source terminals 5 flows on and along the current path 7 depicted in FIG. 2 due to its nature, which takes a shortest path in principle. As a result, an induction coil 1 of this kind comes to give rise to regions 8 of a lower-density current in the surface thereof and thereby again causes another ununiformities thereon and therearound. In the mean time, the regions 8 are only in part shown in FIG. 2 for clarity.

Such an uneven magnetic field brings about an uneven heating capacity distribution over the coil and thereby a growing crystal is adversely affected in quality. For instance, when a raw material rod is rotated and transferred relative to the induction heating coil 1 in such a uneven magnetic field, a pair of a higher and the following lower layer in a dopant concentration is periodically produced in the growing portion within one revolution of the rod due to differentials of local heating capacity caused by the uniformity in the uneven magnetic field surrounding the coil. In one revolution of the rod, a dopant concentration of the growing front of the crystal becomes lower in a portion at a higher temperature and conversely the dopant concentration becomes higher in a portion at a lower temperature, which is called "periodical resistivity variation". Semiconductor wafers produced by slicing a single crystal rod having such a repetition in bulk of the combination of higher and lower concentrations as described above bring about fluctuations in characteristics of a semiconductor device fabricated starting therefrom due to microfluctuation in resistivity observed in the regions of periodical resistivity variations.

A contrivance to compensate the faults observed in the first prior art has been made, which is constructed in such a manner that as shown in FIG. 3, a single-turn flat coil 1 has two slits 6 extending from the inner periphery 2 towards the outer periphery 4 and further to the contrary another three slits 6 extending from the outer periphery in the reverse way (the Japanese first publication No.52-30705, hereinafter referred to as the second prior art). In this second prior art, the induction heating coil 1 has a plurality of slits 6 with all the widths thereof being same in dimension as that of the gap 3 at the ends of the coil 1. The slits 6 are arranged at equal distance intervals in the circumferential direction. The configuration of said slits has a geometrical periodicity about the center of the coil. Under such conditions a high-frequency current is controlled to flow in the surface of the coil 1 so as to keep an axial symmetry to the central axis of the coil.

Even an induction heating coil in the second prior art, however, is not able to avoid occurrence of lower current density regions 8 in the surface of the coil, as shown in FIG. 3. This phenomenon originates in the nature of a high-frequency current flowing a shortest path and in the structural restriction of the induction heating coil itself as well.

In particular, the induction heating coil 1 has to have such a configuration for cooling the coil that a coolant may flow inside of the coil having a hollow structure. In line with the requirement, narrow regions 9 should be provided at least both on the outer periphery side and on the inner periphery side of the coil, where the widths of the narrow regions 9 should be large enough to allow the coolant water to flow through. Consequently, the high-frequency current does not take a path along and in close vicinity to the inner periphery and along both the sides of slits and thereby the lower-density current regions 8 are created in the surface of the coil. With this configuration of the coil 1, the current path 7 is not able to be selected nearer enough toward the inner periphery and thereby a stirring power in the core portion of the molten zone becomes week, so that resistivities in the core portion of a semiconductor crystal rod thus produced are the lower corresponding to the decrease in the stirring power.

SUMMARY OF THE INVENTION

In view of the technological situation of the induction heating coil in the prior art, the present invention was made to solve problems existing in the situation. It is an object of the present invention to provide an induction heating coil which may control the path of a high-frequency current in the surface, by which a semiconductor single crystal may be grown with an uniform distribution profile of resistivity therein.

An induction heating coil to be used for FZ method according to the present invention, which is composed of a metal or alloy, has another metal or alloy different in conductivity (hereinafter referred to as a second metal) placed in a predetermined place(s) in the surface of the coil and thereby may have a controlled path of a high-frequency current flowing across the surface of the coil.

The above-mentioned second metal is, for example, a metal or alloy having a higher conductivity than a metal or alloy composing a coil. In one of examples of the case the combination of bronze for a metal of the coil and copper or silver for a second metal may be preferably selected. The second metal is preferably arranged at least in close vicinity to the surface of the coil. In another example, a plurality of slits, which extend in the radial direction from the inner periphery and/or from the outer periphery of the coil, may be arranged at equal distance intervals about the center of the coil and the above-mentioned second metal as a narrow long strip may be disposed both on and along the periphery of the slits and on and along the inner periphery of the coil. In a further example, a plurality of narrow regions covered by an insulating material extend in the radial direction from the inner periphery and/or the outer periphery on the surface of the coil and the above-mentioned second metal as a narrow long strip may be arranged on and along both the periphery of the insulating material cover and the inner periphery of the coil.

In still another example, the above-mentioned second metal may be selected from metals or alloys having a lower conductivity than a metal used for composing a coil body.

What's more, the second metal strip may be most effectively used by being arranged in the surface of a coil so as to be symmetrical to the central axis of the coil and to make a high-frequency current to take a round route meandering between the inner periphery and outer one periodically, in particular in alternate selection of inner paths or outer paths in the surface of the coil.

Still further, the second metal may preferably selected to be a metal or alloy having a higher conductivity than a metal to be used for composing a coil and in addition, another metal or alloy having a lower conductivity than a metal composing the coil may be selected to be disposed on and along the second metal strip in an enclosing manner from the outside of the second metal or alloy.

The present invention has a purpose to obtain a uniform electromagnetic field about the central axis of the induction heating coil by disposing in the surface thereof a second metal different in electric conductivity from a metal composing the coil and thereby adjusting the path of a high-frequency current in the surface. For instance, a second metal higher in conductivity than a metal composing the coil is laid in and along a desired high-frequency current path and thereby the high-frequency current flows selectively in and along the long narrow and thin strip of the second metal in the surface, where the current path thus obtained is the desired one. Under these conditions, an electromagnetic field is formed uniform around the induction heating coil by placing the long narrow and thin strip of the second metal in and along the desired current flowing path and then making the high-frequency current to flow in and along the second metal selectively.

In order to obtain a specially uniform magnetic field, a second metal is to be arranged to be symmetrical to the central axis of an induction heating coil. Particularly in case that the second metal is arranged to take a round route meandering between the inner periphery and outer one cyclically in alternate selection of points in close vicinity to the peripheries, the axial symmetry of the electromagnetic field is well guaranteed.

Further, in view of the so-called skin effect that a high-frequency current has a habit to flow in the vicinity of the surface of a conductor, a second metal is required to be placed only in the vicinity of the surface of a coil in order to achieve the object of the present invention. In general, the thickness of a second metal strip is preferably selected at about 300 $\mu$m or more and in case of copper the selected thickness falls in the range of 60 $\mu$m to 70 $\mu$m.

An induction heating coil, in the surface of which a plurality of slits extending from the inner and/or outer peripheries in the radial direction are arranged at equal distance intervals about the center of the coil and a second metal strip is placed on and along the inner periphery and the periphery of the slits, may produce the more uniform electromagnetic field around the coil due to the combined action of the slits and second metal strip for controlling the current flow path. A plurality of narrow short strips composed of insulating material may be substituted for the empty slits of the coil above mentioned and produce the same effects as achieved by the slits.

In case that another second metal having a lower conductivity is selected and the strip is placed in special regions where a high-frequency current is not desired to flow through, a high-frequency current is difficult to flow through the regions of the second metal of lower conductivity and consequently the path of a high-frequency current becomes controllable in the same way as is observed when a metal or alloy having a higher electric conductivity is selected as a second metal.

When a second metal having higher conductivity than a metal composing a coil is disposed as a strip in the surface of the coil in and along the desired path of a high-frequency current an d a third metal having lower conductivity than the metal composing the coil is applied on and along the second metal in an enclosing manner from the outside, the high-frequency current path can be the more attracted toward the inner periphery of the coil by the help of the third metal. In other words, according to a further embodiment of the present invention, the path of a high-frequency current may be exactly controlled by applying a third metal lower in conductivity, than a metal composing the coil body, in specific regions where the flow of a high-frequency current is not desired to get through.

BRIEF DESCRIPTION OF THE DRAWINGS

The novel features which are considered characteristic of the present invention are set forth particularly in the appended claims. The present invention itself, however, and additional objects and advantages thereof will best be understood from the following description of embodiments thereof when read in connection with the accompanying drawings, in which:

DETAILED DESCRIPTION OF THE PREFERRED EMBODIMENT

Hereinafter, a preferred embodiment according to the present invention will be illustratively explained in reference to the accompanying drawings. However, it is our intention that the scope of the claims appended to the specification of the present invention be not limited by the dimensions, materials, shapes and relative configuration of the structural portions of the coil described in the embodiment, unless otherwise specified, but be construed an example only for an illustration purpose.

Figure 1:
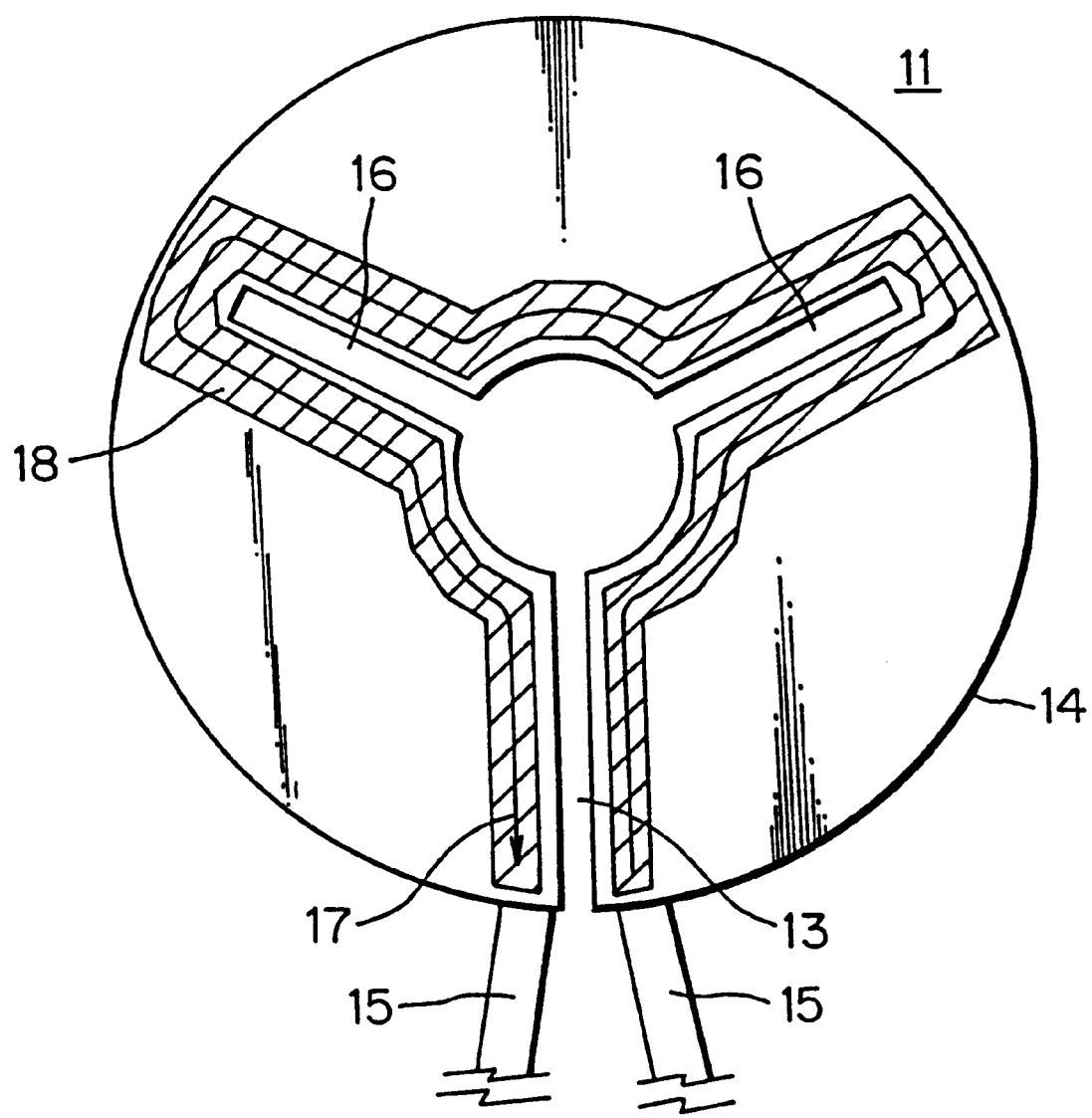
FIG. 1 is a plan view illustrating an embodiment of an induction heating coil according to the present invention.
Figure 2:
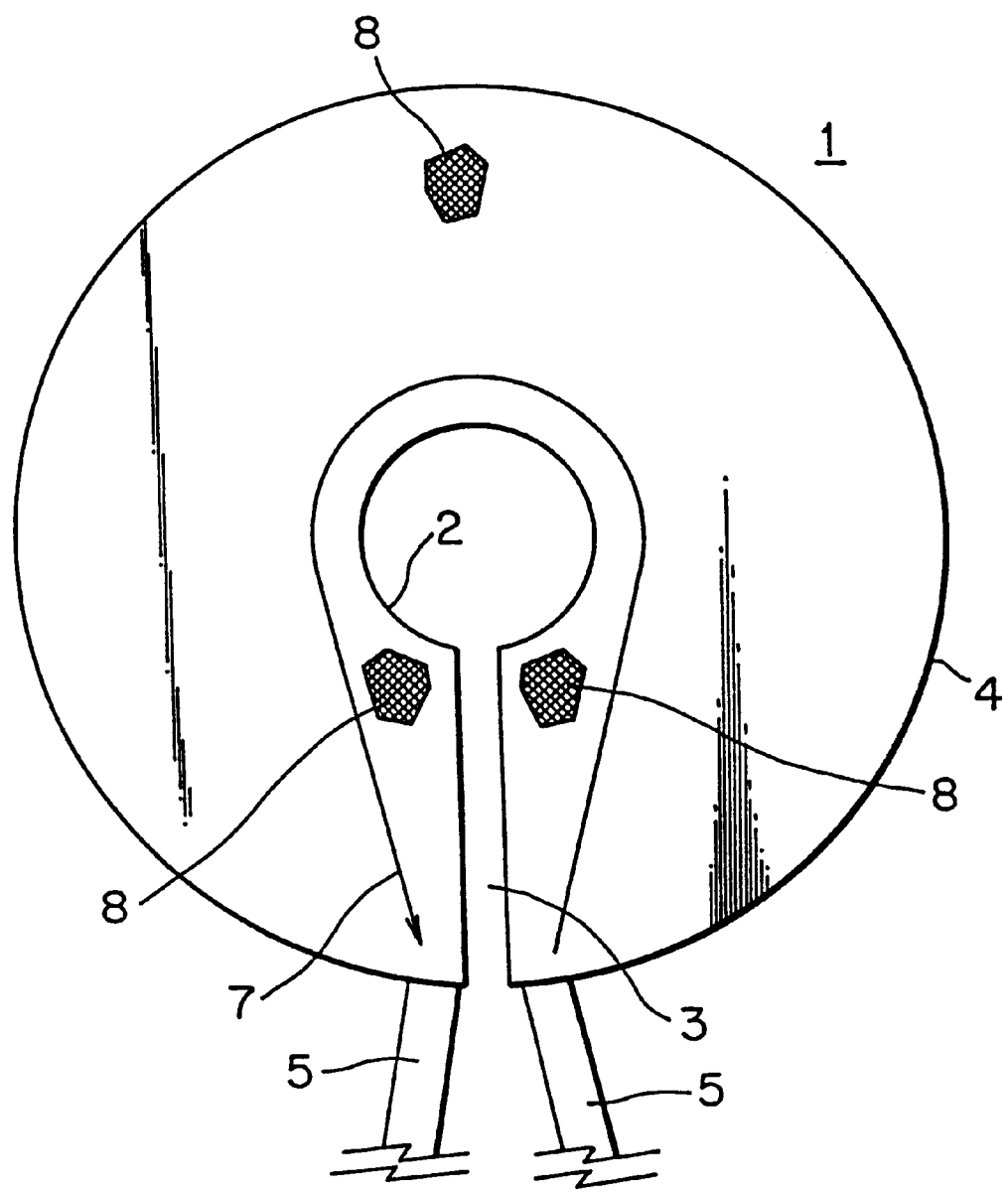
FIG. 2 is a plan view showing an induction heating coil according to the first prior art.
Figure 3:
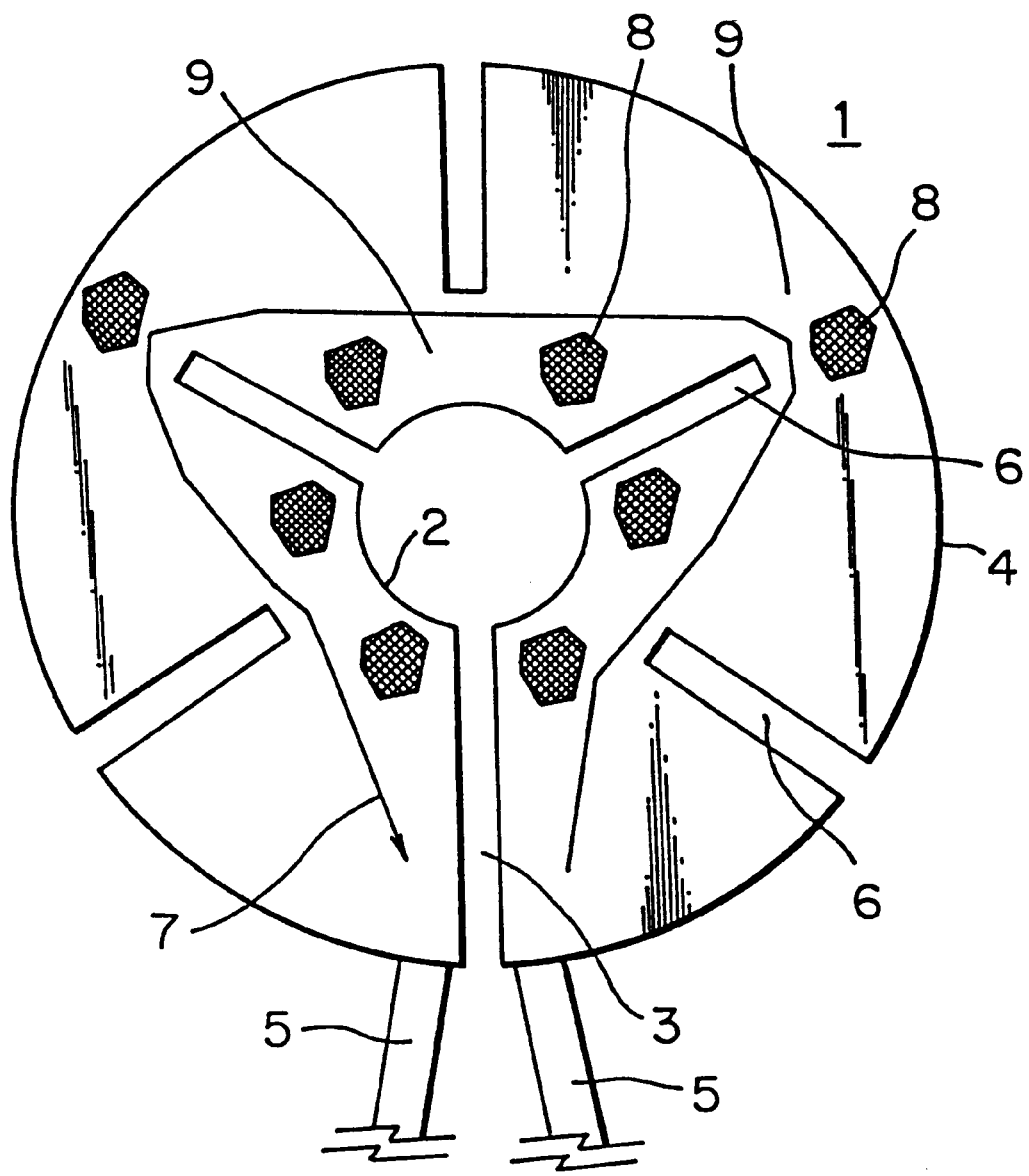
FIG. 3 is a plan view showing an induction heating coil according to the second prior art.

FIG. 1 shows a plan view of an induction heating coil 11 relating to the embodiment of the present invention to be used for an semiconductor crystal grower. The coil 11 of this embodiment has a similar structure to an induction heating coil in the prior art, being made out of a flat-ring shaped hollow conductor 14, both the ends of the ring portion in close vicinity to each other with an interposed end gap 13 therebetween and a pair of power supply terminals 15 connected at two respective points near the ends of the vertical outer side of the ring portion.

The body portion of the induction heating coil 11 according to the embodiment is made of bronze. Two slits having widths equal to that of the gap 13 extend from the inner periphery in the radial direction up to points in the vicinity of the outer periphery still leaving narrow portion for coolant passage, where the gap 13 is designed, in such a manner that it cuts through the ring portion perpendicular to a tangent at the ends of the vertical outer side thereof. Besides, they are disposed on the surface of the coil in such a manner that the angles between the gap 13 and each of the following slits 16 as seen to the left and to the right in the figure are equal to each other at 120 degrees. A long narrow and thin strip 18 made of silver as a second metal is embedded in the surface of the coil on and along both the sides of the end gap 13, inner periphery 12 and both the sides of each slit 16 starting and ending at the power supply terminals 15.

According to the above-described construction, a high-frequency current supplied from the power supply terminals 15 flows in and along the silver strip embedded in the coil along both the sides of the end gap 13, inner periphery 12 and both sides of each slit 16 and thereby the current path 17 is drawn adequately near to the inner periphery and the axial symmetry of the current path 17 on the surface is realized, so that an extremely uniform electromagnetic field is formed around the induction heating coil.

Figure 4:
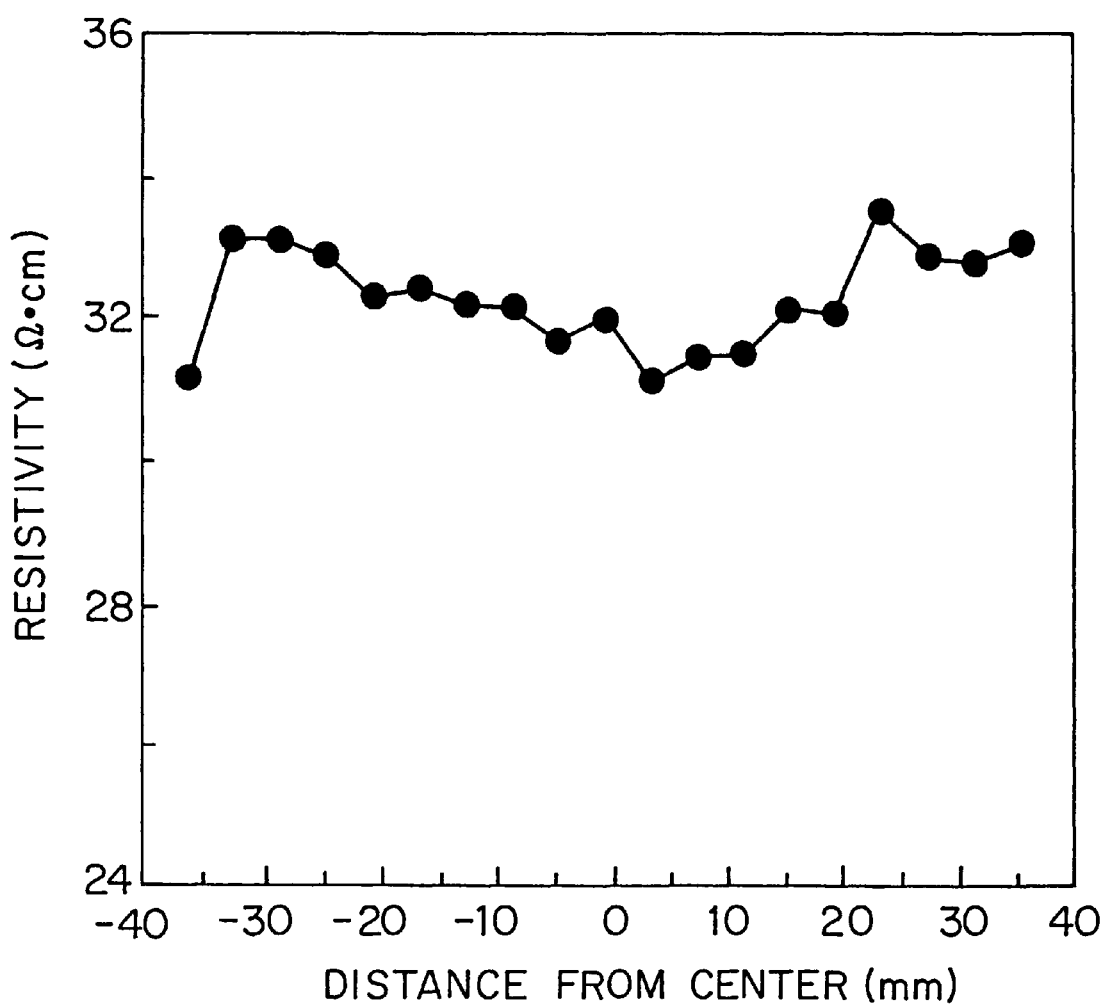
FIG. 4 is a graph showing a resistivity distribution across a diameter of a semiconductor crystal rod grown by the use of an induction heating coil of an embodiment according to the present invention.
Figure 5:
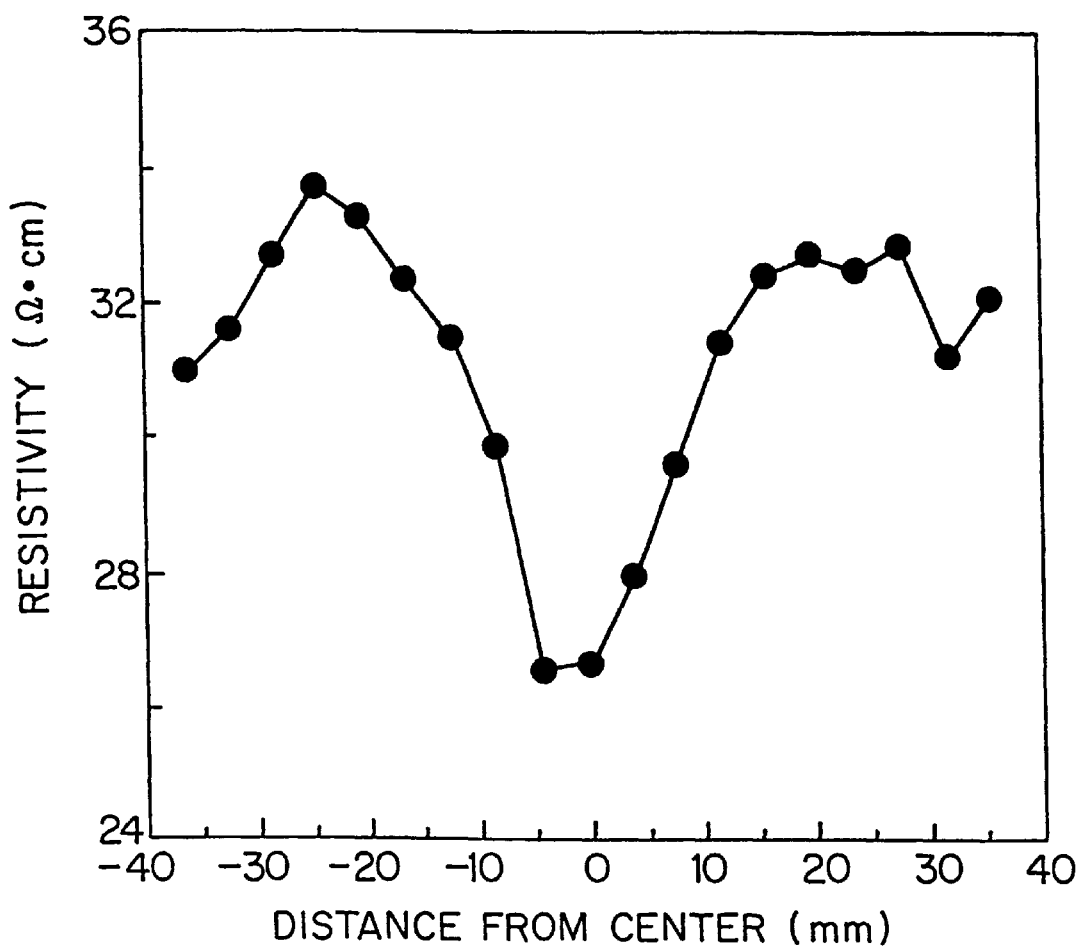
FIG. 5 is a graph showing a resistivity distribution across a diameter of a semiconductor crystal rod grown by the use of an induction heating coil according to the second prior art.

FIG. 4 shows a resistivity distribution profile across a diameter of a silicon single crystal rod grown by means of an induction heating coil 11 according to the embodiment. FIG. 5 shows that of a silicon crystal rod grown by means of an induction heating coil 1 according to the second prior art taken as a comparative example.

As seen from FIGS. 4 and 5, the resistivity distribution observed in case of the induction heating coil of the comparative example has a larger spread and specially a sharp drop of resistivity values is observed in the middle portion of the cross section. While in case of the induction heating coil according to the embodiment the single silicon crystal has an extremely uniform resistivity distribution profile across a diameter. As described above, the usage of the induction heating coil according to the embodiment guarantees growth of a silicon single crystal with an extremely uniform resistivity profile across a diameter.

Instead of bronze as a metal of the induction heating coil and silver as a second metal in the embodiment above described, other combinations of metals may be chosen both for a metal of the induction heating coil and for a second metal. That is, in the case, combinations where a second metal is higher in conductivity than a metal composing the body of an induction heating coil and at the same time paramagnetic are effective candidates for use in other embodiments according to the present invention. Such combinations as an alloy as a metal of an induction heating coil and a metal as a second metal, a metal and a metal, a metal and an alloy and finally an alloy and an alloy are considered to be usable.

In order to apply a second metal in the surface of a coil according to the present invention, methods can be adopted such as to embed a metal strip in a groove formed in the body surface of an induction heating coil, said metal strip being shaped specially corresponding to that of the groove; and to dispose a meandering long, narrow and thin strip of the second metal on the surface of a coil, said metal strip being formed thereon by means of a metallization patterning in which a desired second metal is first vapor-deposited all over the body surface of the coil and then the metal deposition film being selectively etched off in an optical lithography process.

What is claimed is:

1. A floating zone melting apparatus including an induction heating coil comprising a slit disk-shaped conductor composed of a first metal or alloy and having an inner periphery, and means comprising a second metal or alloy different in electrical conductivity from that of the first metal or alloy, disposed at locations in the vicinity of a surface of the slit disk-shaped conductor for defining a path of high-frequency current at the inner periphery of said slit disk-shaped conductor in accordance with said locations of said second metal or alloy.

2. The floating zone melting apparatus according to claim 1, wherein the second metal or alloy has higher electric conductivity than the first metal or alloy.

3. The floating zone melting apparatus according to claim 2, wherein the first metal is bronze and the second metal is either copper or silver.

4. The floating zone melting apparatus according to claim 2, wherein a plurality of slits extending from an inner periphery and/or from an outer periphery of the coil are arranged at equal distance intervals in the body surface of the coil about the center of thereof and the second metal or alloy is disposed on and along an inner periphery and both the sides of each slit.

5. The floating zone melting apparatus according to claim 2, wherein insulating material is disposed in narrow regions on the body surface of the coil extending from an inner periphery and/or from an outer periphery in the radial direction and the second metal or alloy is disposed on and along an inner periphery and both the sides of each region.

6. The floating zone melting apparatus according to claim 1, wherein the second metal or alloy is disposed at the surface of the coil.

7. The floating zone melting apparatus according to claim 1, wherein a plurality of slits extending from an inner periphery and/or from an outer periphery of the coil are arranged at equal distance intervals in the body surface of the coil about the center thereof and the second metal or alloy is disposed on and along an inner periphery and both the sides of each slit.

8. The floating zone melting apparatus according to claim 1, wherein insulating material is disposed in narrow regions on the body surface of the coil extending from an inner periphery and/or from an outer periphery in the radial direction and the second metal or alloy is disposed on and along an inner periphery and both the sides of each region.

9. The floating zone melting apparatus according to claim 1, wherein the second metal or alloy has lower electric conductivity than the first metal or alloy.

10. The floating zone melting apparatus according to claim 1, wherein the second metal or alloy is disposed symmetrically to the central axis of the coil.

11. The floating zone melting apparatus according to claim 10, wherein a long narrow and thin strip made of the second metal or alloy is disposed in the surface of the coil in such a manner that it meanders between the outer and inner peripheries of the coil.

12. The floating zone melting apparatus according to claim 1, wherein the second metal or alloy has higher electric conductivity than the first metal or alloy and further including another metal or alloy with lower electric conductivity than the first metal or alloy disposed on and along the second metal in an enclosing manner from the outside thereof.

13. An induction heating coil for use in a floating zone melting apparatus comprising a conductor composed of a first metal or alloy, and means comprising a second metal or alloy different in electrical conductivity from that of the first metal or alloy, disposed in a predetermined place or predetermined places in the vicinity of a surface of the coil for controlling a path of high-frequency current in said coil wherein a plurality of slits extending from an inner periphery and/or an outer periphery of the coil are arranged at equal distance intervals in the body surface of the coil about the center thereof and the second metal or alloy is disposed on and along an inner periphery and both sides of each slit.

14. An induction heating coil used in a floating zone melting apparatus according to claim 13, wherein the second metal or alloy has a higher electrical conductivity than the first metal or alloy.

15. An induction heating coil used in a floating zone melting apparatus according to claim 14, wherein the first metal is bronze and the second metal is either copper or silver.

16. An induction heating coil used in a floating zone melting apparatus according to claim 13, wherein the second metal or alloy is disposed at the surface of the coil.

17. An induction heating coil used in a floating zone melting apparatus according to claim 13, wherein the second metal or alloy has a higher electric conductivity than the first metal or alloy and further including another metal or alloy with lower electric conductivity than the first metal or alloy disposed on and along the second metal in an enclosing manner on the outside thereof.

18. An induction heating coil for use in a floating zone melting apparatus comprising a conductor composed of a first metal or alloy, and means comprising a second metal or alloy different in electrical conductivity from that of the first metal or alloy, disposed in a predetermined place or predetermined places in the vicinity of a surface of the coil for controlling a path of high-frequency current in said coil wherein insulating material is disposed in narrow regions on the body surface of the coil extending from an inner periphery and/or from an outer periphery in the radial direction and the second metal or alloy is disposed on and along an inner periphery and both sides of each region.

19. An induction heating coil used in a floating zone melting apparatus according to claim 18, wherein the second metal or alloy has a higher electrical conductivity than the first metal or alloy.

20. An induction heating coil used in a floating zone melting apparatus according to claim 19, wherein the first metal is bronze and the second metal is either copper or silver.

21. An induction heating coil used in a floating zone melting apparatus according to claim 18, wherein the second metal or alloy is disposed at the surface of the coil.

22. An induction heating coil used in a floating zone melting apparatus according to claim 18, wherein the second metal or alloy has a higher electric conductivity than the first metal or alloy and further including another metal or alloy with lower electric conductivity than the first metal or alloy disposed on and along the second metal in an enclosing manner on the outside thereof.

* * * * *